Jan. 9, 1968 A. LATOUR Re. 26,336

STATIONARY CONTACT STRUCTURE FOR ELECTRICAL CIRCUIT BREAKERS

Original Filed Dec. 15, 1961

INVENTOR
Andre Latour

BY Stevens, Davis, Miller & Mosher
ATTORNEYS

United States Patent Office

Re. 26,336

Patented Jan. 9, 1968

26,336

STATIONARY CONTACT STRUCTURE FOR ELECTRICAL CIRCUIT BREAKERS

André Latour, Grenoble, France, assignor to Ets Merlin & Gerin S.A., Grenoble, France Original No. 3,202,781, dated Aug. 24, 1965, Ser. No. 159,614, Dec. 15, 1961. Application for reissue Oct. 10, 1966, Ser. No. 589,180

9 Claims. (Cl. 335—195)

Matter enclosed in heavy brackets [ ] appears in the original patent but forms no part of this reissue specification; matter printed in italics indicates the additions made by reissue.

This invention relates to stationary contacts for electrical circuit breakers and more especially to stationary contacts for high breaking capacity circuit breakers.

In circuit breakers for high breaking capacities, the movable part of the circuit breaker has considerable inertia due to its bulky structure.

To avoid the bruising of the stationary sparking contact and its progressive destruction, under the influence of the shocks imparted by the movable contact, it has been proposed to provide the stationary terminal with a movable contact at the end of its circuit closing movement is which can be a main or/and arcing contact bias means whereby electrical connection means are provided between the movable member and the stationary terminal. This stationary contact structure has given good results in absorbing the shock of the movable contact of the circuit breaker, but is unsatisfactory in the case of a circuit breaker having a very high breaking capacity where the spring bias is unable to absorb the total of the kinetic energy of the movable contacts, and cannot eliminate bouncing of the same.

It is an object of the present invention to provide an improved stationary contact structure in which the dangers of bruising and bouncing of the contacts are eliminated or reduced.

With this main object in view, the structure according to the invention includes a contact member resiliently supported by the conductor or conductors electrically connecting said member to the stationary terminal, a resilient abutment being provided so that the kinetic energy imparted to this contact member by the shock of the movable contact at the end of its circuit closing movement is absorbed simultaneously by the resilient conductors and by the resilient abutment.

Another object of the invention is to increase the contact pressure in the closed position of the circuit breaker without further means except these supporting conductors to urge magnetically the movable contact of the circuit breaker toward the stationary contact structure.

The invention will best be understood from a consideration of the following specification of a preferred embodiment thereof given by way of example, and referring to the accompanying drawings, in which.

Figure 1:
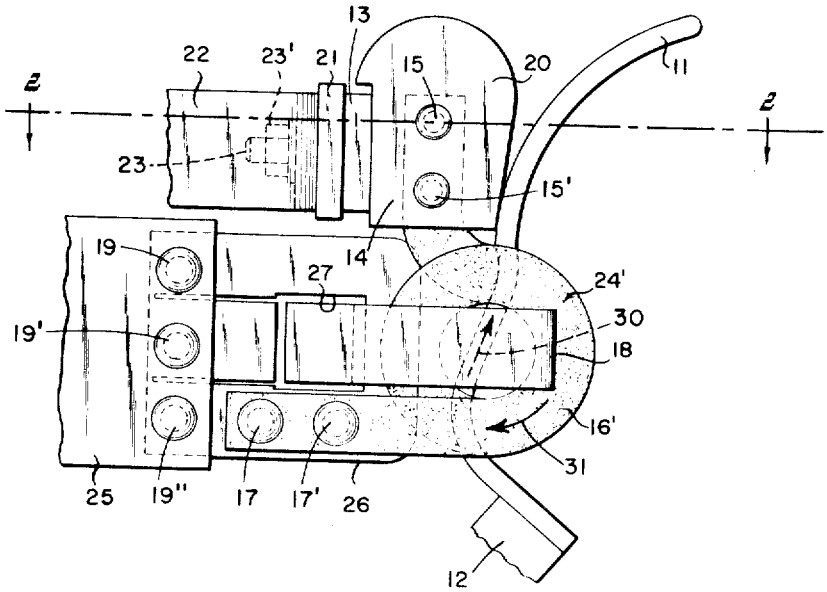
FIG. 1 shows an elevational view of the pressure contacts according to the invention.
Figure 2:
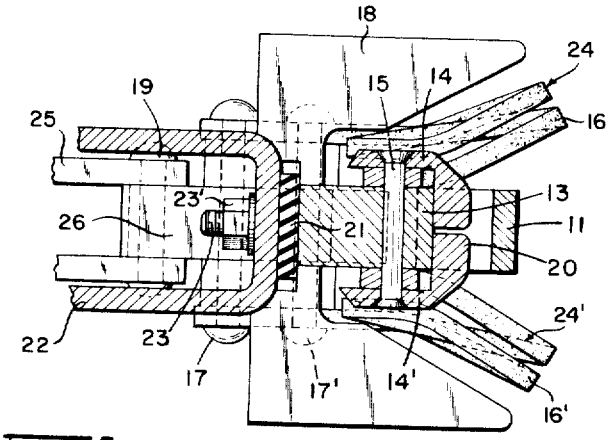
FIG. 2 represents a section along the line II—II of FIG. 1.

The circuit breaker to which the invention is applied comprises a movable contact 11 [and a stationary contact 20 which may be shaped as an arcing contact and which is so mounted on the insulator 22 by a bolt 23 that it can perform a limited movement in a direction parallel with the plane in which the movable contact moves. A rubber ring 21 is interposed between the insulator and the contact 20. The weight of the contact 20 is supported by the upper ends of the conductors 24 and 24', each of which is bent to form two turns covered by a layer of insulating material 16, 16'. The opposite ends of the conductors are rigidly connected respectively to the contact 20 and to the terminal 25 through the intermediary of a support member 26 having an opening 27 through which a U-shaped magnetic circuit 18 plate passes. The insulator 22 may be independent or may be solidly connected to the terminal 25 or to the insulator supporting the terminal. The stationary conductors 24, 24' are so designed, that their elasticity ensures a limited mobility to the contact member 20. As already known, the current flow in the winding formed by the conductors 24, 24' and the current flow in the movable contact 11, in the closed position of this contact, develop electrodynamic forces which urge the movable contact 11 toward the contact 20. The number of turns of the winding is chosen in accordance with the desired degree of closing pressure. The magnetic circuit 18 allows the concentration of a magnetic field in the useful part between the windings, where the arc is formed, and tends to displace the arc toward the arcing portions of the contact 11 and 20] *carried by arm 12 and a stationary contact 20 formed of a metallic block 13 held between jaws 14, 14' by rivets 15, 15' which may be shaped as an arcing contact and which is so mounted on the insulator 22 by a bolt 23 and nut 23' that it can perform a limited movement in a direction parallel with the plane in which the movable contact moves. A rubber ring 21 is interposed between the insulator and the contact 20. The weight of the contact 20 is supported by the upper ends of the conductors 24 and 24', each of which is bent to form two turns covered by a layer of insulating material 16, 16'. The opposite ends of the conductors are rigidly connected respectively to the contact 20 by bolts 15, 15' and to the terminal 25 by bolts 19, 19', 19" through the intermediary of a support member 26 having an opening 27 through which a U-shaped magnetic circuit 18 plate passes. The insulator 22 may be independent or may be solidly connected to the terminal 25 or to the insulator supporting the terminal. The stationary conductors 24, 24' are so designed, that their elasticity ensures a limited mobility to the contact member 20. As already known, the current flow in the winding formed by the conductors 24, 24' (indicated by arrow 31) and the current flow in the movable contact 11 (indicated by arrow 30), in the closed position of this contact, develop electrodynamic forces which urge the movable contact 11 toward the contact 20. The number of turns of the winding is chosen in accordance with the desired degree of closing pressure. The magnetic circuit 18 allows the concentration of a magnetic field in the useful part between the windings, where the arc is formed, and tends to displace the arc toward the arcing portions of the contact 11 and 20.*

What is claimed is:

[1. A shock absorbing contact for the movable contact arm of a circuit breaker comprising:

(a) a first fixed support (b) a contact bearing resiliently mounted on said first fixed support and axially reciprocable on said support (c) a second fixed support mounted below said first fixed support (d) resilient spring conductor means connected at one end to said fixed support and at the other end to said contact bearing and extending from said second fixed support to said contact bearing (e) said spring conductor means having its said other end reciprocable with said contact bearing and its said one end stationary with respect to said second fixed support (f) said resilient conductor means including coil means positioned between the connected ends of said spring conductor means (g) said coil means lying in a plane generally projected in the direction of travel of said movable contact arm.]

[2. A shock absorbing unit as in claim 1 and wherein:

(a) said coil means includes a first coil connected at one end to the right side of said contact bearing and connected at the other end to the right side of said second fixed support (b) a second coil connected at one end to the left side of said contact bearing and connected at the other end to the left side of said second fixed support (c) said first and second coils being axially spaced from each other.]

[3. A shock absorbing unit as in claim 1 and including:

(a) a magnetic core mounted on said second fixed support and having arms extending laterally and alongside said coil means.]

*4. In an electrical circuit breaker of the type comprising a stationary contact member displaceably mounted on said circuit breaker, a movable contact member mounted on said circuit breaker for cooperation with said stationary contact member, resilient spring conductor means one end thereof being in fixed relationship to said circuit breaker, said stationary contact member being resiliently supported on the other end of said resilient conductor means, a shock absorbing device mounted on said circuit breaker and disposed in spatial relationship to said stationary contact member to limit the displacement thereof in the direction of motion of said movable contact member and to absorb the shock resulting from the closure of said contact members, the resilient spring conductor means being in such a spatial relationship with respect to said movable contact that in the closed contact position repulsive electrodynamic forces are developed which urge said contacts together.*

*5. In a circuit breaker of the type as set forth and comprising the combination as set forth in claim 4, in which said resilient spring conductor means have the form of a coil having at least one convolution.*

*6. In a circuit breaker of the type as set forth and comprising the combination as set forth in claim 4, said resilient spring means being bent in such a manner that, seen in projection in a plane parallel to the motion of said movable contact member, the projection of said conductor means intersects twice the projection of the path of the electric current in said movable contact member.*

*7. In a circuit breaker of the type as set forth and comprising the combination as set forth in claim 4, said resilient spring means being coiled to form a coil having at least a convolution in such a manner that, seen in projection in a plane parallel to the motion of said movable contact member, the projection of each convolution of said coil intersects twice the projection of the path of the electric current in said movable contact member.*

*8. In a circuit breaker of the type and comprising the combination as set forth in claim 4, in which said resilient spring conductor means comprise two separate conductors mounted electrically in parallel and symmetrically disposed relatively to the plane of motion of said movable contact member.*

*9. In a circuit breaker of the type and comprising the combination as set forth in claim 5, in which said resilient spring conductor means comprise two coiled conductors, forming each a coil having at least one convolution, said coils being electrically connected in parallel and disposed symmetrically to the plane of motion of said movable contact member.*

*10. A shock absorbing contact for the movable contact arm of a circuit breaker comprising:*

*(a) a first fixed support*

*(b) a contact bearing resiliently mounted on said first fixed support and axially reciprocal on said support*

*(c) a second fixed support mounted below said first fixed support*

*(d) resilient conductor means connected at one end to said fixed support and at the other end to said contact bearing and extending from said second fixed support to said contact bearing*

*(e) said conductor means having its other end reciprocal with said contact bearing and its said one end stationary with respect to said second fixed support*

*(f) said resilient conductor means including coil means positioned between the connected ends of said spring conductor means*

*(g) said coil means lying in a plane generally projected in the direction of travel of said movable contact arm.*

*11. A shock absorbing contact as claimed in claim 10 in which:*

*(a) said coil means includes a first coil connected at one end to the right side of said contact bearing and connected at the other end to the right side of said second fixed support*

*(b) a second coil connected at one end to the left side of said contact bearing and connected at the other end to the left side of said second fixed support*

*(c) said first and second coils being axially spaced from each other.*

*12. A shock absorbing contact as claimed in claim 10 and including a magnetic core mounted on said second fixed support and having arms extending laterally along the side of said coil means.*

References Cited

The following references, cited by the Examiner, are of record in the patented file of this patent or the original patent.

UNITED STATES PATENTS

| | | | |
|---|---|---|---|
| 2,545,341 | 3/1951 | Caswell | 335—16 |
| 2,555,251 | 5/1951 | Schultz | 200—170 |
| 2,579,523 | 12/1951 | Terry | 200—166 |
| 2,679,561 | 5/1954 | Thompson | 335—194 |
| 2,683,875 | 7/1954 | Axelrad | 200—166 |
| 2,727,114 | 12/1955 | Kesselring | 200—166 |
| 2,759,076 | 8/1956 | Curtis | 200—170 |
| 2,821,594 | 1/1958 | Latour | 335—195 |

BERNARD A. GILHEANY, *Primary Examiner.*

R. N. ENVALL, JR., *Assistant Examiner.*